United States Patent
Pach

(10) Patent No.: US 9,615,543 B2
(45) Date of Patent: Apr. 11, 2017

(54) SELF-ADJUSTING MAGNETIC LINK

(71) Applicant: Lotek Wireless Inc., Newmarket (CA)

(72) Inventor: Marek Pach, Toronto (CA)

(73) Assignee: LOTEK WIRELESS INC., Newmarket, Ontario (CA)

(*) Notice: Subject to any disclaimer, the term of this patent is extended or adjusted under 35 U.S.C. 154(b) by 569 days.

(21) Appl. No.: 14/238,127

(22) PCT Filed: Jul. 25, 2013

(86) PCT No.: PCT/CA2013/000669
§ 371 (c)(1),
(2) Date: Feb. 10, 2014

(87) PCT Pub. No.: WO2014/022907
PCT Pub. Date: Feb. 13, 2014

(65) Prior Publication Data
US 2016/0295837 A1 Oct. 13, 2016

(30) Foreign Application Priority Data
Aug. 9, 2012 (CA) .................... 2785105

(51) Int. Cl.
A01K 27/00 (2006.01)
H01F 7/02 (2006.01)
A01K 1/04 (2006.01)

(52) U.S. Cl.
CPC ............ *A01K 27/001* (2013.01); *A01K 1/04* (2013.01); *A01K 27/004* (2013.01); *A01K 27/005* (2013.01); *H01F 7/0263* (2013.01)

(58) Field of Classification Search
CPC .... A01K 27/00; A01K 27/001; A01K 27/002; Y10T 24/32; A63H 33/046; H01F 7/0263
(Continued)

(56) References Cited

U.S. PATENT DOCUMENTS 2,597,601 A    5/1952 Sherman
2,824,681 A *  2/1958 Sorkin .................... A61C 3/04
                                                  2/170
(Continued)

FOREIGN PATENT DOCUMENTS

WO    WO 01/47431     2/2001
WO    WO 2012/066287  11/2011

OTHER PUBLICATIONS

"Technical Note: Breakaway and Expansion Collars" www.telonics.com/literature/technotes/techcollars/techintro.html, pp. 1-3, Jun. 24, 2012.
Smith et al., :An expandable radiocollar for elk calves Wildlife Society Bulletin, 26(2), pp. 113-117, 1998.
(Continued)

*Primary Examiner* — Lisa Tsang
*Assistant Examiner* — Magdalena Topolski
(74) *Attorney, Agent, or Firm* — KaganBinder, PLLC

(57) ABSTRACT

The present invention is a self-adjusting link for connecting two anchors that move under a varying external force, comprising: N magnetic units; N-1 link connectors, each link connector connecting one unit to an adjacent unit, each magnetic unit being held by the link connectors such that each pair of adjacent units can move from a closed position where they are magnetically bound to an open position where they do not exert significant force on each other; and anchor connectors attached to the anchors. The length of the link increases as the external force increases sufficiently to cause one or more pairs of magnetic units to move from the closed position into one of the open positions to permit the anchors to further separate, and the length of the link decreases as the external force is reduced and one or more pairs of magnetic units move into the closed position.

18 Claims, 6 Drawing Sheets

(58) Field of Classification Search
USPC ......... 63/900; 24/303; 403/DIG. 1; 220/230; 224/183; 446/92, 129
See application file for complete search history.

(56) References Cited

U.S. PATENT DOCUMENTS

| | | | |
|---|---|---|---|
| 3,943,912 A * | 3/1976 | Nakayama | A61F 5/03 |
| | | | 600/15 |
| 4,587,956 A | 5/1986 | Griffin et al. | |
| 4,826,059 A | 5/1989 | Bosch et al. | |
| 5,501,180 A | 3/1996 | Beere | |
| 6,348,033 B1 | 2/2002 | Catlett | |
| 6,530,508 B1 | 3/2003 | Devine | |
| 6,587,022 B1 | 7/2003 | Devine | |
| D478,170 S | 8/2003 | Catlett | |
| 7,187,261 B2 * | 3/2007 | Cassar | B23Q 3/1546 |
| | | | 335/303 |
| 8,070,671 B2 | 12/2011 | Deem et al. | |
| 8,187,164 B2 | 5/2012 | Kugler et al. | |
| 8,910,596 B2 * | 12/2014 | Finlan | A01K 27/001 |
| | | | 119/856 |
| 2015/0130176 A1 * | 5/2015 | Lowery | B42D 1/06 |
| | | | 281/21.1 |

OTHER PUBLICATIONS

"Expansion/Breakaway Collars" Telonics, Inc. Products—Expansion/Breakaway Collars, www.telonics.com/products/expansionBreakawayCollars/index.php, pp. 1-2, updated Dec. 9, 2009.

* cited by examiner

SELF-ADJUSTING MAGNETIC LINK

RELATED APPLICATION

This application claims the benefit from International Application No. PCT/CA2013/000669, filed Jul. 25, 2013, which in turn claims priority from Canadian Application having serial number 2,785,105, filed on Aug. 9, 2012, both of which are incorporated herein by reference in their entireties.

FIELD OF THE INVENTION

The present invention relates generally to magnetic links, and more particularly to magnetic links adapted to increase and decrease in length according to an external force.

BACKGROUND OF THE INVENTION

Collars are placed around the necks of animals for various reasons, such as to attach an electronic device to an animal for purposes of tracking it. However, with wild animals who are not in frequent contact with humans, it is not safe to use a fixed length collar, particularly with young animals, since if the animal grows significantly such that the circumference of its neck increases, the animal would eventually be strangled as a result of the fixed length collar. An elastic material may be used, but such collars continually exert force on the animal's neck, which force may get larger as the animal grows, and may be damaging to the animal.

Expandable collars have been disclosed. These employ loops of collar material with each loop closed by a weak link so that when sufficient force is applied one of the the links breaks and the collar circumference expands by the amount of material that is in the loop. Such collars are available, for example, from Telonics, Inc. While these types of collars support a limited amount of expansion, they cannot contract. This may cause problems, for example, when an animal loses a significant amount of weight, such as due to sickness or hibernation, as the collar may become very loose.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

The present invention provides a self-adjusting link for connecting a first anchor to a second anchor, the first and second anchors being spaced apart by a distance, and being movable relative to each other so that the distance between the anchors varies according to a varying external force that pulls the anchors away from each other, the link comprising:

(a) N magnetic units, each magnetic unit comprising a permanent magnet, N being an integer greater than or equal to two;

(b) N−1 link connectors, each link connector directly connecting one magnetic unit to an adjacent magnetic unit such that N−2 magnetic units, being interior magnetic units, are each directly connected to two other magnetic units, and two magnetic units, being first and second end magnetic units, are each directly connected to only one other magnetic unit, each magnetic unit being held by the link connectors in an orientation such that each pair of adjacent magnetic units can move from a closed position, in which the adjacent magnetic units are sufficiently close together that they are bound together by magnetic force, to an open position in which the adjacent magnetic units are spaced apart so that the magnets in the two magnetic units do not exert significant magnetic force on each other; and (c) first and second anchor connectors, wherein the first end magnetic unit is attached to the first anchor by the first anchor connector and the second end magnetic unit is attached to the second anchor by the second anchor connector, wherein the length of the link, being equal to the distance between the anchors, increases as the external force increases sufficiently to cause one or more pairs of magnetic units to move from the closed position into one of the open positions to permit the anchors to further separate, and the length of the link decreases as the external force is reduced and one or more pairs of magnetic units move from one of the open positions into the closed position.

The link connectors may bias each pair of magnetic units into the closed position.

N may be at least three so that there is at least one interior magnetic unit.

Each magnet may have first and second ends, and a longitudinal axis therebetween, and front and back faces, wherein the link connectors hold the magnetic units so that the longitudinal axes of all the magnets are substantially aligned so that the front face of a first magnet is adjacent to the back face of an adjacent second magnet when the first and second magnetic units are in the closed position, and the polarity of the front face of the first magnet is opposite to the polarity of the back face of the second magnet. The link connectors may bias each pair of magnetic units into the closed position. The magnets may be cuboids having a height, width and thickness, the height being the length of the longitudinal axis between the first and second ends, so that each of six faces of each magnet is substantially rectangular. The height of each magnet may be greater than twice its width, and the width may be greater than the thickness. The height of each magnet may be greater than its width.

Each magnet may be a disk having a radius and having a thickness that is less than the radius.

Each magnet may have first and second ends, and a longitudinal axis therebetween, the first and second ends of each magnet may have opposite polarity, and, for each pair of first and second adjacent magnets, the polarity of the first end of the first magnet may be opposite to the polarity of the first end of the second magnet. The magnets may be cuboid or cylindrical.

Each magnetic unit may have first and second longitudinal edges parallel to the magnet's longitudinal axis, so that each link connector connects to the first longitudinal edge of one magnetic unit in a pair of adjacent magnetic units via a first hinge and connects to the second longitudinal edge of the adjacent magnetic unit via a second hinge so that each magnetic unit can rotate in the same rotational direction around the hinge connecting it to the link connector so that the adjacent magnetic units can move between the closed position and one of the open positions, and wherein the bias provided by the connecting members causes all the magnets to rotate in the same rotational direction into the closed position when the external force is sufficiently reduced. The hinges may bias each pair of magnetic units into the closed position. Each hinge may constrain the magnetic units connected to the hinge from moving more than 180 degrees around the hinge from the closed position. The link connectors may be rigid. The link connectors may be made from a ferromagnetic material.

The link connectors may comprise portions of a continuous piece of flexible material that extends around all the magnets. The flexible material may surround the magnets. The anchor connectors may comprise portions of the piece of flexible material, and the flexible material may comprise two strips of tape, each having a length approximately equal to the maximum length of the link.

The invention also provides a collar comprising a link, being a link as described above, and a partial loop, the partial loop being another link as described above, wherein the first anchor is on the first anchor connector of the partial loop and the second anchor is on the second anchor connector of the partial loop. The anchor connectors may be link connectors.

The invention also provides a collar comprising a strip of flexible material having two ends, one anchor being located at each end of the strip, and the link as described above.

The invention also provides a collar comprising a partial loop of bendable material having two ends that are spaced apart by a gap length that varies, as the material bends according to the application and removal of an external force, between a minimum and a maximum gap length, each end having an anchor, and the link as described above, wherein the length of the link in different configurations varies between the minimum and maximum gap lengths.

DETAILED DESCRIPTION OF THE INVENTION

Figure 1:
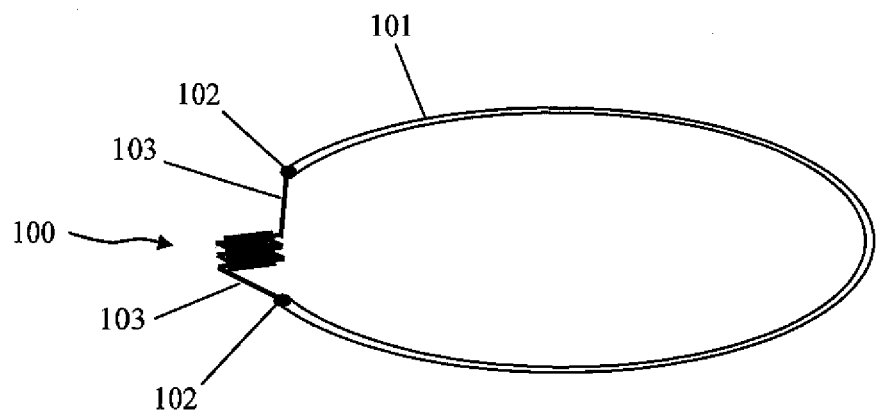
FIG. 1 is a top view of an embodiment of a collar employing the self-adjusting magnetic link, where the pairs of magnetic units are all in the closed position.

FIGS. 1-4 depict an embodiment of the invention attached to a partial loop 101, which may be a strip of flexible or bendable material, such as leather or plastic, to form a collar, which may be suitable for placing around the neck of an animal, for example. The partial loop 101 has two anchors 102 at the two ends of the collar that are spaced apart from each other, and the distance between the anchors can vary according to an external force that pulls the anchors away from each other. For example, when used as an animal collar, the surface of an animal's neck creates such a force as the animal's neck grows larger over time, which causes the link 100 to expand, and as the animal's neck shrinks, for example during sickness or hibernation, the force is reduced and the link 100 contracts. The link 100 attaches to two anchors 102 on the two ends of the partial loop 101 by two anchor connectors 103, to form the collar depicted in FIGS. 1-4.

The link 100 comprises at least 2 magnetic units 200, each magnetic unit 200 containing at least one permanent magnet. In general, there are N magnetic units 200, where N is an integer greater than or equal to two, and preferably at least three, and each magnetic unit 200 contains at least one permanent magnet. The link 100 comprises N−1 link connectors 201, each of which directly connects two adjacent magnetic units 200 so that N−2 magnetic units 200, being interior magnetic units, are each directly connected to two other magnetic units 200, and two magnetic units 200, being end magnetic units, are each directly connected to only one other magnetic unit 200. Each end magnetic unit is directly connected by an anchor connector 103 to one of the anchors 102 so that the connected partial loop 101 and link 100 form a complete collar. The connection between one or both of the anchor connectors 103 and the anchors 102 may be releasable, for example by employing a clip on the end of one of the anchor connectors 103, and a loop as the corresponding anchor 102 so that the clip may be attached to and removed from the loop by a person opening and closing the clip.

Figure 5:
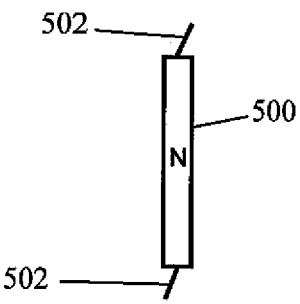
FIG. 5 is a top view of an embodiment of a magnetic unit having its north pole at the top end.
Figure 6:
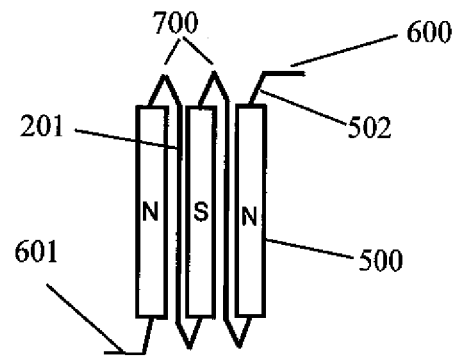
FIG. 6 is a top view of an embodiment of a link in the closed position using three of the magnetic units of FIG. 5.
Figure 7:
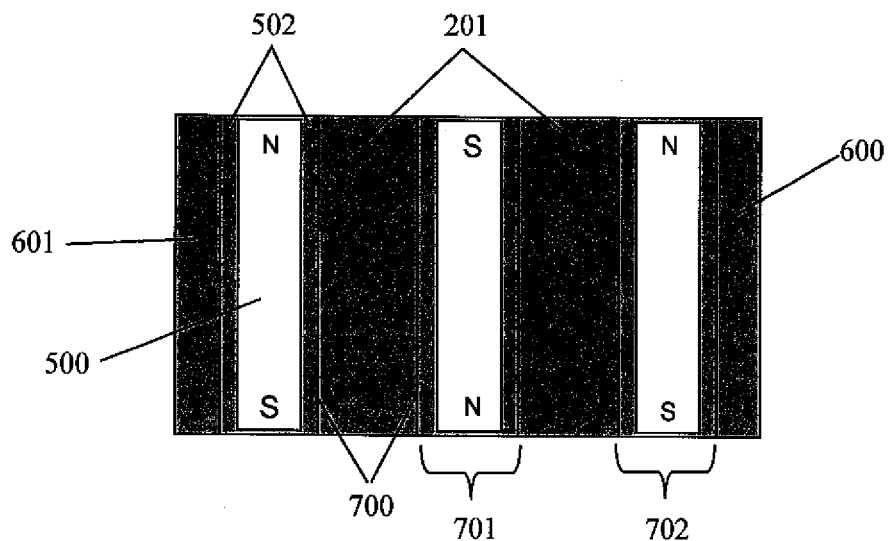
FIG. 7 is a front view of a link having three magnetic units, each magnet having its magnetic poles at the top and bottom ends.
Figure 8:
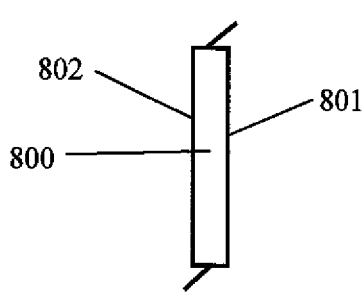
FIG. 8 is a top view of an embodiment of a magnetic unit having its magnetic poles at the front and back faces.

Examples of embodiments of magnetic units are depicted in isolation in FIGS. 5 and 8 in a top-down view. In the depicted embodiments, each magnetic unit includes a cuboid magnet having six substantially rectangular faces. In some embodiments, as depicted in FIGS. 5-7, the magnets may be constructed so that the top and bottom ends and faces of the magnets 500 have opposite polarity, in which case, the magnets 500 are oriented so that, for each adjacent pair of magnets 500, the top end of one magnet 500 has polarity opposite that of the top end of the other magnet 500, as in FIG. 6. In a preferred embodiment, shown in FIGS. 8-10, the magnets 800 are magnetized so that the front and back faces of the magnets 800 have opposite polarity so that the magnets 800 are all oriented in the same manner.

Referring to FIGS. 5-7, each magnetic unit comprises a magnet 500 and magnet connectors 502 to which the link connectors 201 are attached. In some embodiments, the magnet connectors may be part of the magnet but it is generally preferred to employ a non-magnetic connector 502 extending from each longitudinal edge of each magnetic unit. In the depicted embodiment, the link connectors 201, magnet connectors 502, and anchor connectors 600, 601 are all formed from lengths of the same material, which material surrounds the magnets 500. For example, the material may be reinforced adhesive tape, such as Kevlar™ duct tape, with one strip adhered to the back face of each magnet 500, as shown in FIG. 7, and another strip adhered to the front face of each magnet (not shown), so that the link connectors 210 and magnet connectors 502 are formed from two pieces of tape adhered directly to each other, and the magnets 500 are maintained so that the longitudinal axis of each magnet, being the vertical axis between the top and bottom ends of each magnet, are maintained in alignment, substantially parallel to each other. In this embodiment, the tape has a number of fold lines 700 separating the link connectors 210 from the magnet connectors 502.

Figure 14:
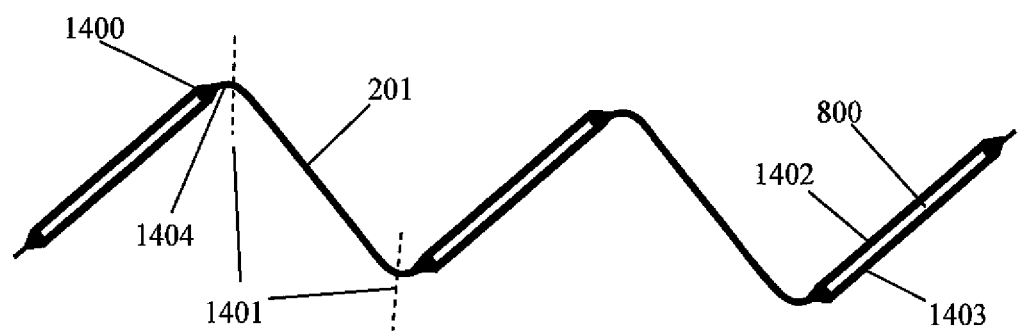
FIG. 14 is a top view of another embodiment of a link comprising front and back strips of tape without anchor connectors with the pairs of magnetic units all in an open position.

FIG. 14 shows a top view of an embodiment that uses two strips of tape where the two pieces of tape 1402, 1403 surround the magnets 800 and form the link connectors 201, magnet connectors and anchor connectors (not shown in FIG. 14). As shown in FIG. 14, the tape does not necessarily bend to form a sharp fold line between the link connectors 201, the link connectors 201 being the portion of the tape between the dashed fold lines 1401, and the magnet connectors 1404, the magnet connectors 1404 being the portions of the tape between the dashed fold lines 1401 (being one of the two the longitudinal edges of the magnetic unit) and the closest face 1400 of the magnet 800 (being one of the two longitudinal faces of the magnet 800).

Figure 9:
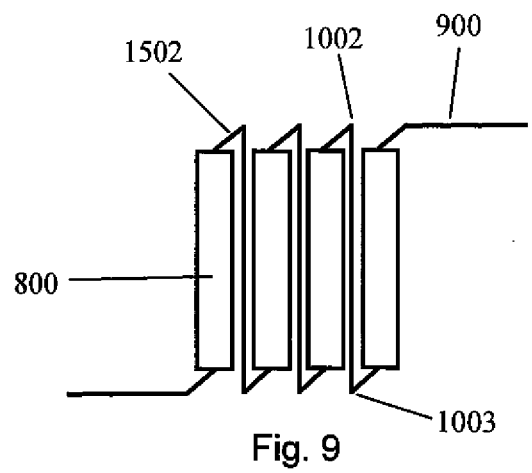
FIG. 9 is a top view of an embodiment of a link using four of the magnetic units of FIG. 8.
Figure 10:
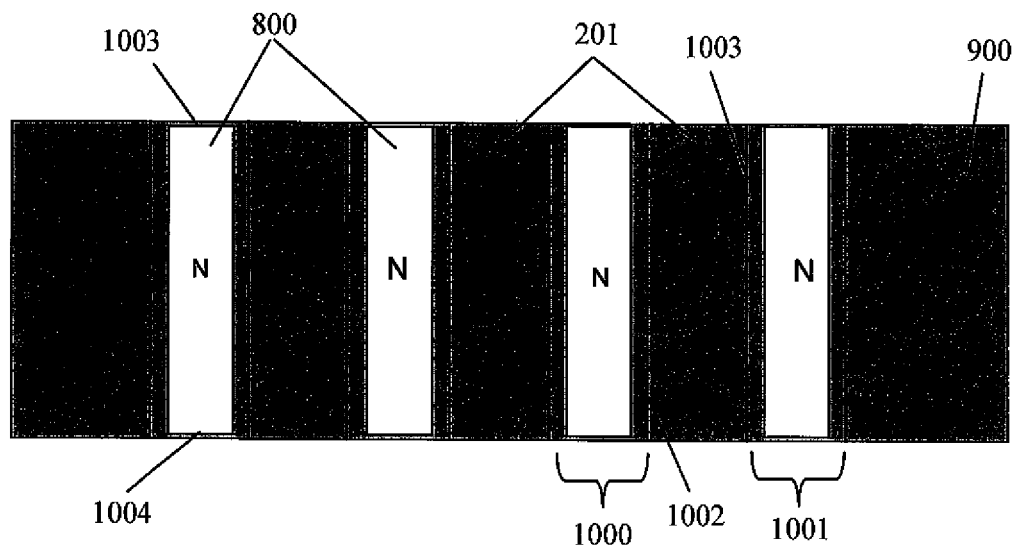
FIG. 10 is a front view of a link having four magnetic units, each unit having its magnetic poles at the front and back faces.

Each adjacent pair of magnetic units, such as items 701 and 702 in FIG. 7, or items 1000 and 1001 in FIG. 10, can move between the closed position and an open position by rotation about the fold lines 700, 1002, 1003, which act as hinges. FIGS. 1, 6 and 9 show examples of configurations in which all pairs are in the closed position, so that the link as a whole is in the fully closed configuration. In the closed position, the front face of the first magnet in a pair is adjacent to the back face of the other magnet adjacent to the first magnet, with the link connectors 201 sandwiched between them. The magnets are polarized and oriented so that portions of these faces having opposite polarity are nearest to each other in the closed position. In the preferred embodiment shown in FIG. 9, the polarity of the front face 802 of the magnet 900 is the same at all points on the face, with the polarity of the back face 801 also being the same at all points, but opposite to that of the front face 802. In FIG. 10, the visible front faces are all north poles, and the back faces (not shown) are all south poles.

It should be noted that, if the magnetic units are free to rotate in both rotational directions about the fold lines or hinges, there are actually two closed positions for each pair, one where the front face of the first magnet in a pair is adjacent to the back face of the second magnet in the pair, and a second closed position in which the back face of the first magnet is adjacent to the front face of the second magnet. The two closed positions correspond to two possible rotational directions (right, left). In order for all the pairs to close as depicted in FIGS. 1, 6 and 9, it is necessary that each magnet rotates in the same rotational direction when moving into the closed position. This can be achieved by having all the link connectors 201, in combination with the magnet connectors, bias the magnets towards each adjacent magnet so that, when they are in the open position, they all rotate in the same rotational direction when the force separating the anchor connectors is removed, or when such force is sufficiently reduced.

Figure 15:
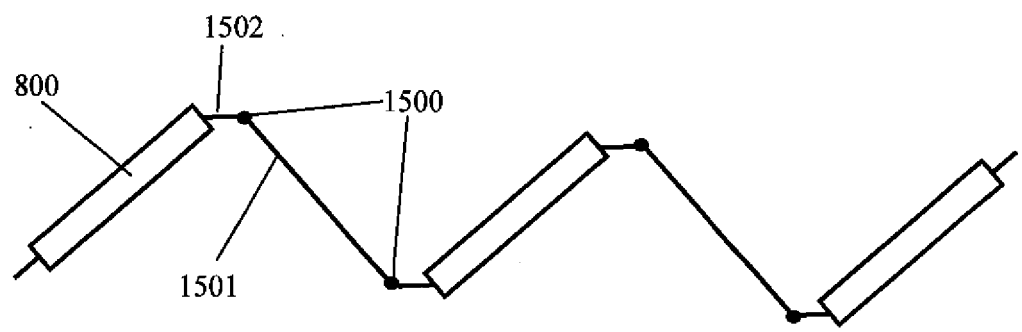
FIG. 15 is a top view of another embodiment of a link comprising mechanical hinges without anchor connectors with the pairs of magnetic units all in an open position.

Alternatively, a mechanical hinge may be used to connect the link connectors 1501 to the magnet connectors 1502, as shown in FIG. 15, where the hinge only permits relative rotation of the magnets 800 and link connector 1501 from the closed position by 180 degrees to a maximally open position. In this case, each pair of adjacent magnets has only a single closed position, and the link has only one fully closed configuration. For some purposes, it may be desirable to let the magnets 800 and link connector 1501 rotate somewhat more than 180 degrees (e.g. to 200 degrees) as long as the magnets cannot rotate to the point where magnetic attraction to the adjacent magnet becomes significant.

It should be noted that such biasing is not required for all applications. For example, if the link is used in a situation where it is physically moved by the movement of the anchors, such movement will generally be sufficient, in the absence of a separating force, to cause the magnetic attraction of the adjacent magnets to move pairs into the closed position. However, if no biasing is employed, it is preferred to use hinges that prevent movement beyond 180 degrees as described above so that all magnets rotate in the same rotational direction when moving into the closed position. Otherwise, there are up to $2^{N-1}$ closed configurations for the link, only two of which have all the link connectors 201 sandwiched between the adjacent magnets (as in FIG. 9). Such a link will still function correctly, but may close into fully closed configurations in which the link is irregularly shaped, which may be undesirable for some applications, and, depending on the number of magnets, some of the pairs of magnets may not be able to achieve a state where the portions of each adjacent face with opposite polarity are directly adjacent to each other.

An open position is shown in FIG. 10 in which the magnets are all separated. A pair of magnetic units 1000, 1001 can be moved from this position to the closed position by rotating the first unit 1001 in one rotational direction about the fold 1003 nearest to the first unit between the two magnets, and rotating the second unit 1000 in the same rotational direction about the fold 1002 nearest to the second unit between the two magnets so that the units move from the configuration shown in FIG. 10 to the configuration shown in FIG. 9.

Figure 2:
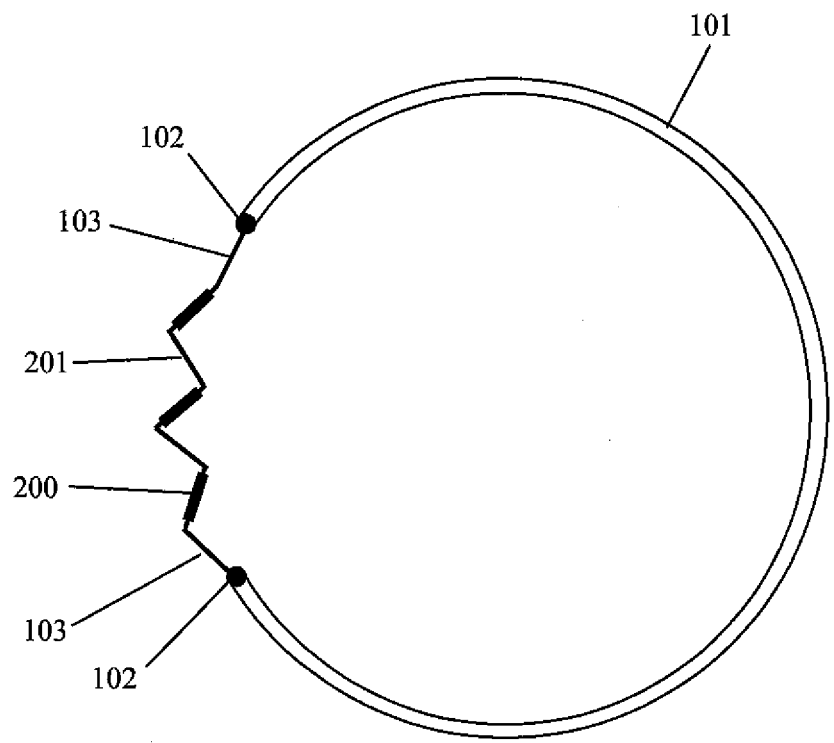
FIG. 2 is a top view of an embodiment of a collar employing the self-adjusting magnetic link, where the pairs of magnetic units are all in an open position.
Figure 3:
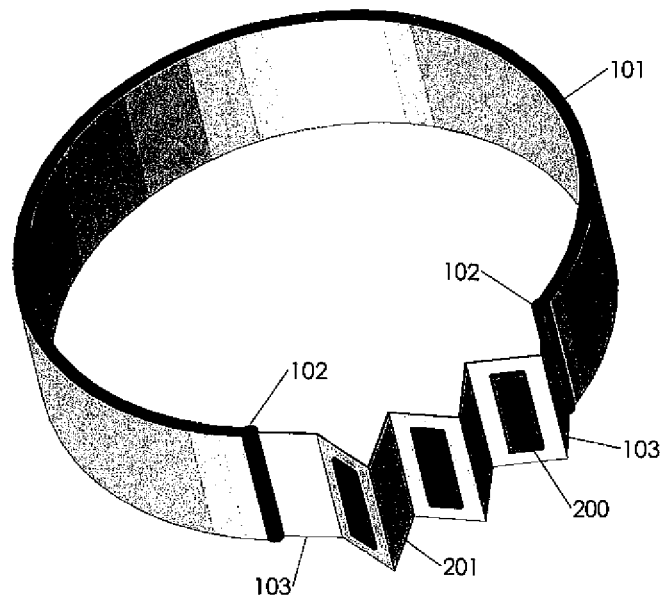
FIG. 3 is a perspective view of another collar employing an embodiment of the self-adjusting magnetic link, where the pairs of magnetic units are all in an open position
Figure 4:
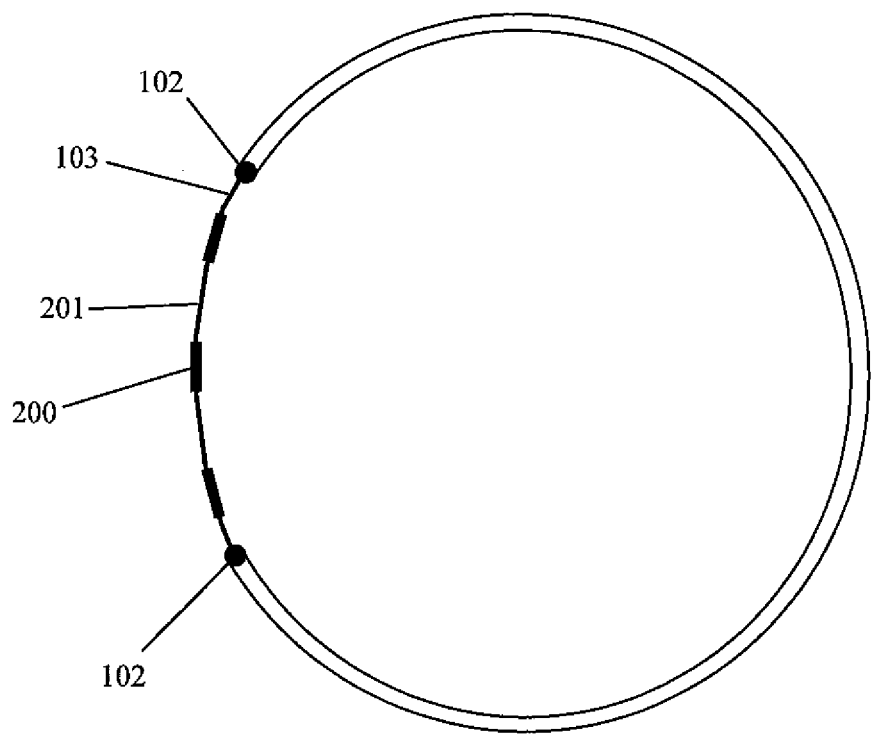
FIG. 4 is a top view of an embodiment of a collar employing the self-adjusting magnetic link, where the pairs of magnetic units are all in an open position where the link is nearly maximally extended.

When the link is attached to two anchors and the anchors are subject to an external force that tends to pull them further apart, that force may be resisted, for example, by the link 100 in the closed position as shown in FIG. 1. When the force becomes sufficiently large to overcome the magnetic bond between at least one pair of adjacent magnets, the distance between the anchor points increases. For example, FIG. 2 shows the link having moved into a partially open configuration and FIG. 4 shows a link in a nearly fully open configuration. The maximum distance between the anchors, assuming that the external force is not sufficient to break the link, is the distance between the distal ends of the anchor connectors 103 when the link is in the fully open configuration, such as in FIGS. 7 and 10. The link connectors 201 may be designed to bias each pair of adjacent units into the closed position so that when at least one pair is in an open position, and the external force is reduced sufficiently, at least one pair will move to the closed position, and when the force is sufficiently further reduced, or eliminated, all the pairs will move to the closed position. With the tape embodiment discussed above, this may be done, for certain materials, by manually putting the link, into a fully closed configuration where all pairs are closed, and then heating the link for a sufficient time to create a memory of that configuration in the material.

In other embodiments, as shown in FIG. 15, the link may comprise mechanical hinges 1500 to connect the link connectors 1501 to the magnetic units via the magnet connectors 1502. In this case, the hinges 1500 may be adapted to bias each pair into the closed position and/or to prevent rotation beyond 180 degrees from the closed position, as discussed above, so that they all rotate in the same rotational direction when closing. By using magnet connectors 1502 that are angled as shown in FIGS. 15 and 9 (or rotatable to this position), the link connector 201 may be made from a rigid material, since, in the closed position, as shown in FIG. 9, the link connectors do not need to bend in order to allow the front and back faces of adjacent magnets to become proximate so that they are bound by magnetic force in the closed position with the link connectors 201 sandwiched between them. In this case, the link connectors 201 may be made, for example, from a ferromagnetic material, such as iron. Optionally, the link connectors may comprise permanent magnets, although this is not preferred. For example, in the embodiment of FIG. 10, the polarity of the front face of each of the link connectors 201 would be south, and the polarity of the back face of each of the link connectors 201 would be north. The magnet connectors 1502 need not be fixed at the angles shown in FIG. 15, but may simply be rotatable around their connection points with the end face of the magnet 800.

Figure 11:
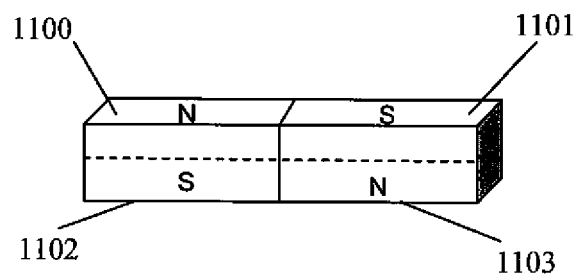
FIG. 11 is a perspective side view of the magnets in a magnetic unit, each unit having its magnetic poles at the front and back faces such that the polarity of the top halves of the front and back faces is opposite to the polarity of the bottom halves of the front and back faces.
Figure 12:
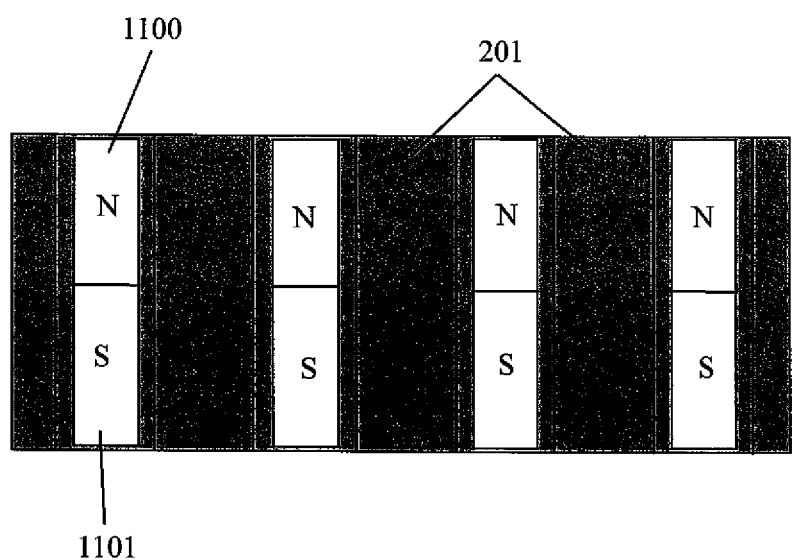
FIG. 12 is a front view of a link comprising four magnetic units employing the arrangement of magnets shown in FIG. 11.

It is not essential that each magnetic unit include only one magnet. For example, FIG. 11 shows a configuration of two magnets. Each magnet has front and back faces having opposite polarity. As shown in FIG. 11, the left magnet has the front face 1100 polarized as north and the back face 1102 is polarized as north. The polarities of the second magnet are reversed (which is equivalent to rotating the left magnet by 180 degrees about its longitudinal axis) so that the front face 1101 is polarized as south and the back face 1103 is polarized as south. FIG. 12 shows a front view of a link formed from such pairs of magnets in the fully open configuration.

Figure 13:
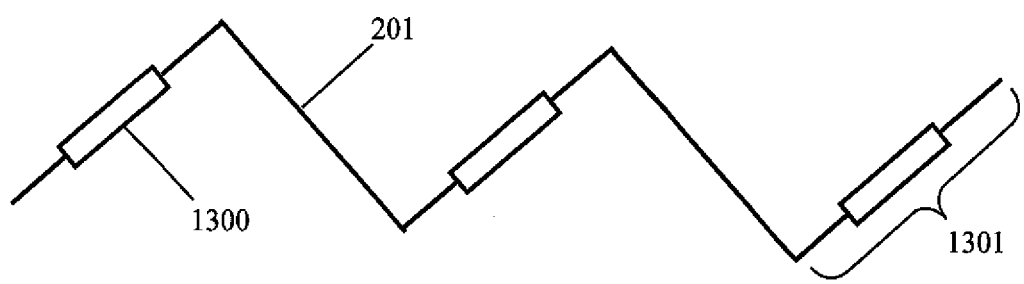
FIG. 13 is a top view of an embodiment of a link without anchor connectors with the pairs of magnetic units all in an open position.

Various shapes and sizes of magnets may be employed. For example, FIG. 13 shows a top view where the magnets are narrower relative to the magnet connectors than in the other depicted embodiments. The magnets in FIG. 13 may be disks rather than cuboids, for example. In general, the thickness of such disks will be selected to be less than the radius of the disks. When the magnets are cuboids, the height of the magnets, being the vertical distance between the top face 1003 and bottom face 1004 in the orientation shown in FIG. 10, is generally chosen to be greater than the width of the magnets, and preferably more than twice the width. The thickness is generally chosen to be less than the width. Generally it is preferred to select the minimum thickness for which magnets, such as rare earth magnets, that is commercially available that provides sufficient magnetic force for the intended use. It is generally preferred to employ magnets of the same size, but this is not essential.

The magnitude of the force required to open pairs of magnets may be varied by selecting magnets with the appropriate magnetic field strength. The binding strength of pairs of magnets can always be reduced by padding the front and back faces with a non-magnetic material to limit how close the faces come to each other in the closed position. Since the force is roughly exponential with respect to distance, a small thickness of padding can cause a relatively large reduction in the strength of the bond between the magnets in the closed position.

It may also be desirable to vary the relative strengths of the magnetic bonds between the magnets in each pair relative to other pairs. For example, one embodiment could have each successive pair in a link be somewhat weaker than the preceding pair, ordering the pairs from one end magnet to the other end magnet. This allows the sequence of opening of pairs to be pre-determined, which may be desirable for some applications.

It should be noted that the external force pulling the anchors apart is generally not continuous. For example, when used as an animal collar on a growing animal, the force will increase as the animal grows while the link is in a given configuration until the point that the force is sufficient to overcome the magnetic attraction of the least strongly bound pair of magnets. At that point, that pair will move into an open position, and until the animal grows to a point where its neck starts to apply force to the anchors when that pair is in the fully open position, there will be relatively little force being applied. For example, when one pair is only partially open and all the others are closed, and the open pair is sufficiently open that there is no significant magnetic force between the magnets in that pair, then the only force being applied will be from the bias, if any, biasing that pair towards the closed position. This may be a very small force, or in some cases effectively no force at all (ignoring gravitational forces).

Figure 16:
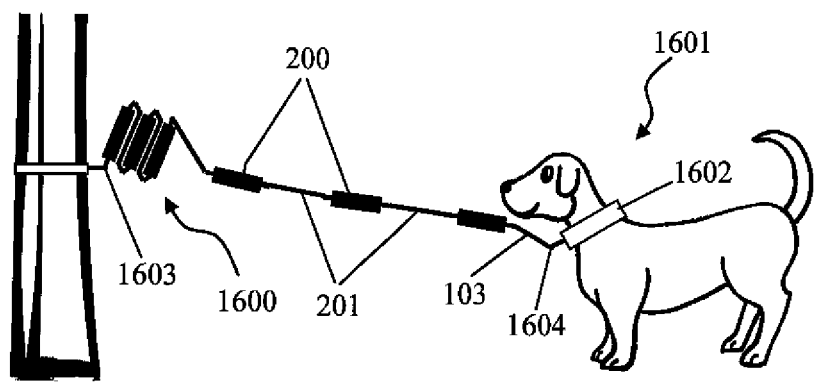
FIG. 16 depicts a dog attached to a tree by a link with the link, shown in a top view.

While the description has focused on the use of the link in collars, it will be evident to skilled persons that it is not limited to such uses. In particular, it is not required that the two anchors be attached to the same object. FIG. 16 shows an example of the use of an embodiment of the link as a dog leash where one anchor 1604 is on a dog collar 1602 around the neck of a dog 1601, and the other anchor 1603 is attached to a tree or pole (or could be attached to a handle held by the dog's owner). In the configuration depicted, two pairs of magnetic units 1600 remain in the closed position and the three other pairs are in an open position with the rightmost two pairs being fully open. This allows the dog to move further away from the tree by pulling the anchor on its collar with sufficient force to overcome the magnetic bond of the weaker of the two closed pairs. If the dog moves closer to the tree, the bias provided by the link connectors and/or hinges will cause one of the open pairs to close, so that the leash is always maintained relatively taught and will not touch the ground.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A collar comprising a partial loop and a self-adjusting link, the partial loop comprising a strip of material having first and second ends with a first anchor at the first end and a second anchor at the second end, the first and second anchors being spaced apart by a distance, and being movable relative to each other so that the distance between the first and second anchors varies according to a varying external force that pulls the anchors away from each other, the self-adjusting link comprising:
   (a) N magnetic units, each of the N magnetic units comprising a permanent magnet, N being an integer greater than or equal to two, one of the N magnetic units being a first end unit and one of the N magnetic units being a second end unit;
   (b) N−1 link connectors, each of the N−1 link connectors directly connecting one of the N magnetic units to an adjacent one of the N magnetic units, each of the N magnetic units together with an adjacent one of the N magnetic units being a pair of adjacent magnetic units, each of the N magnetic units being held by the N−1 link connectors in an orientation such that each pair of adjacent magnetic units can move from a closed position, in which the magnetic units in the pair of adjacent magnetic units are sufficiently close together that they are bound together by magnetic force, to one of a plurality of open positions in which the magnetic units in the pair of adjacent magnetic units are spaced apart so that the permanent magnets in the pair of adjacent magnetic units do not exert significant magnetic force on each other; and
   (c) first and second anchor connectors, wherein the first end unit is attached to the first anchor by the first anchor connector and the second end unit is attached to the second anchor by the second anchor connector,
   wherein the distance between the first and second anchors, being the length of the self-adjusting link, increases as the external force increases sufficiently to cause one or more of the pairs of adjacent magnetic units to move from the closed position into one of the open positions to permit the first and second anchors to further separate, and the length of the self-adjusting link decreases as the external force is reduced and one or more of the pairs of adjacent magnetic units move from one of the open positions into the closed position.

2. The collar of claim 1, wherein N is at least 3 so that N−2 magnetic units are interior magnetic units that are each directly connected to two other of the N magnetic units, and the first and second end units of the N magnetic units are each directly connected to only one of the N−2 interior magnetic units.

3. The collar of claim 1, wherein the link connectors bias each pair of adjacent magnetic units into the closed position.

4. The collar of claim 1, wherein N is at least three so that there is at least one interior magnetic unit.

5. The collar of claim 1, wherein each of the permanent magnets has first and second ends, and a longitudinal axis therebetween, and front and back faces, wherein the N−1 link connectors hold the N magnetic units so that the longitudinal axes of all the permanent magnets are substantially aligned so that the front face of a first permanent magnet of the N magnetic units is adjacent to the back face of an adjacent second permanent magnet of the N magnetic units when the magnetic units comprising the first and second permanent magnets are in the closed position, and the polarity of the front face of the first permanent magnet is opposite to the polarity of the back face of the second permanent magnet of the N magnetic units.

6. The collar of claim 5, wherein the link connectors bias each pair of adjacent magnetic units into the closed position.

7. The collar of claim 5, wherein the permanent magnets are each cuboids having a height, width and thickness, the height being the length of the longitudinal axis between the first and second ends, so that each of six faces of each permanent magnet is substantially rectangular.

8. The collar of claim 5, wherein each of the N magnetic units has first and second longitudinal edges parallel to the longitudinal axis of the permanent magnet of the magnetic unit, and wherein each of the N−1 link connectors connects to the first longitudinal edge of one of the N magnetic units in each pair of adjacent magnetic units via a first hinge and connects to the second longitudinal edge of the adjacent magnetic unit via a second hinge, so that each of the N magnetic units can rotate in the same rotational direction around the hinge connecting it to one of the N−1 link connectors, so that the magnetic units in the pair of adjacent magnetic units can move between the closed position and one of the open positions, and wherein the bias provided by the connecting members causes all the permanent magnets to rotate in the same rotational direction into the closed position when the external force is sufficiently reduced.

9. The collar of claim 8, wherein the hinges bias each pair of adjacent magnetic units into the closed position.

10. The collar of claim 8, wherein each hinge constrains the magnetic units in the pair of adjacent magnetic units connected to the hinge from moving more than 180 degrees around the hinge from the closed position.

11. The collar of claim 8, wherein the N−1 link connectors are made from a ferromagnetic material.

12. The collar of claim 1, wherein each permanent magnet of the N magnetic units has first and second ends, and a longitudinal axis therebetween, the first and second ends of each permanent magnet of the N magnetic unit have opposite polarity, and, for each pair of first and second adjacent permanent magnets of the N magnetic units, the polarity of the first end of the first permanent magnet of the N magnetic units is opposite to the polarity of the first end of the second permanent magnet of the N magnetic units.

13. The collar of claim 12, wherein the permanent magnets of the N magnetic units are each cuboid.

14. The collar of claim 12, wherein the permanent magnets of the N magnetic units are each cylindrical.

15. The collar of claim 1, wherein the N−1 link connectors comprise portions of a continuous piece of flexible material that extends around all the N magnetic units.

16. The collar of claim 15, wherein the self-adjusting link has a maximum length, and the flexible material surrounds the permanent magnets; wherein the anchor connectors each comprise portions of the piece of flexible material, and the flexible material comprises two strips of tape, each having a length approximately equal to the maximum length of the self-adjusting link.

17. The collar of claim 1, wherein the strip of material is a strip of flexible material.

18. A collar comprising a partial loop of bendable material having two ends that are spaced apart by a gap length that varies as the material bends according to application and removal of an external force, each end having an anchor, and a self-adjusting link, the self-adjusting link comprising:
- (a) N magnetic units, each of the N magnetic units comprising a permanent magnet, N being an integer greater than or equal to two, one of the N magnetic units being a first end unit and one of the N magnetic units being a second end unit;
- (b) N−1 link connectors, each of the N−1 link connectors directly connecting one of the N magnetic units to an adjacent one of the N magnetic units, each of the N magnetic units together with an adjacent one of the N magnetic units being a pair of adjacent magnetic units, each of the N magnetic units being held by the N−1 link connectors in an orientation such that each pair of adjacent magnetic units can move from a closed position, in which the magnetic units in the pair of adjacent magnetic units are sufficiently close together that they are bound together by magnetic force, to one of a plurality of open positions in which the magnetic units in the pair of adjacent magnetic units are spaced apart so that the permanent magnets in the pair of adjacent magnetic units do not exert significant magnetic force on each other; and
- (c) first and second anchor connectors, wherein the first end unit is attached to the first anchor by the first anchor connector and the second end unit is attached to the second anchor by the second anchor connector, wherein the distance between the first and second anchors, being the length of the self-adjusting link, increases as the external force increases sufficiently to cause one or more pairs of adjacent N magnetic units to move from the closed position into one of the open positions to permit the first and second anchors to further separate, and the length of the self-adjusting link decreases as the external force is reduced and one or more of the pairs of adjacent magnetic units move from one of the open positions into the closed position, wherein the length of the link in different configurations varies between a minimum gap length and a maximum gap length.

* * * * *